(12) United States Patent
Wicker, Jr. et al.

(10) Patent No.: US 8,252,105 B2
(45) Date of Patent: Aug. 28, 2012

(54) BIODEGRADABLE VEHICLE/CARRIER FOR PRINTING INK

(75) Inventors: Calvin M. Wicker, Jr., Spartanburg, SC (US); Bharat Desai, Spartanburg, SC (US); Paul Sullivan, Greer, SC (US)

(73) Assignee: Ethox Chemicals LLC, Greenville, SC (US)

( * ) Notice: Subject to any disclaimer, the term of this patent is extended or adjusted under 35 U.S.C. 154(b) by 192 days.

(21) Appl. No.: 12/071,179

(22) Filed: Feb. 15, 2008

(65) Prior Publication Data

US 2008/0264296 A1  Oct. 30, 2008

Related U.S. Application Data

(60) Provisional application No. 60/901,327, filed on Feb. 15, 2007.

(51) Int. Cl.
*C08L 91/00* (2006.01)

(52) U.S. Cl. ........ 106/244; 106/245; 106/252; 106/253; 106/266; 106/316

(58) Field of Classification Search .................. 106/244, 106/245, 252, 253, 266, 316; 524/313
See application file for complete search history.

(56) References Cited

U.S. PATENT DOCUMENTS

| | | | | |
|---|---|---|---|---|
| 3,953,218 | A | * | 4/1976 | Pollard .......................... 106/504 |
| 6,013,122 | A | * | 1/2000 | Klitzman et al. .......... 106/31.03 |
| 2003/0207971 | A1 | * | 11/2003 | Stuart et al. ................... 524/274 |
| 2006/0057412 | A1 | * | 3/2006 | Jacob et al. ................... 428/523 |

FOREIGN PATENT DOCUMENTS

EP  1033126 A1 *  9/2000

OTHER PUBLICATIONS

Effect of Hydrogenation on Density and Viscosity of Sunflowerseed Oll, pp. 1519-1521, Jul. 1995.*

* cited by examiner

*Primary Examiner* — Patricia L Hailey
*Assistant Examiner* — Veronica F Faison
(74) *Attorney, Agent, or Firm* — Isaac A. Angres

(57) ABSTRACT

Embodiments of the present invention provide a composition useful as an additive to a printing ink. In one embodiment a composition is used that includes a biologically derived base material formed from one or more saturated or unsaturated straight or branched chain triglycerides or combinations thereof, wherein the triglycerides are partially to fully hydrogenated and have a viscosity between about 50 and about 200,000 centipoise at temperatures about 72 degrees Fahrenheit. In another embodiment, the composition further includes a finely divided additive selected from the group consisting of polytetrafluoroethylene or hydrogenated triglycerides in an intimate admixture with the base material. Other aspects relate to a method of making an ink additive and method for printing paper stock by letter press or lithography.

20 Claims, No Drawings

BIODEGRADABLE VEHICLE/CARRIER FOR PRINTING INK

This application claims the priority benefit under 35 U.S.C. section 119 of U.S. Provisional Patent Application No. 60/901,327 entitled "Biodegradable Vehicle/Carrier For Printing Ink" filed Feb. 15, 2007, which is in its entirety herein incorporated by reference.

FIELD OF INVENTION

The present invention relates to a biodegradable vehicle and/or carrier for printing inks. More specifically the invention provides a biodegradable vehicle/carrier that provides abrasion resistance to the ink. The present invention further provides printing ink additives and, more particularly, but not by way of limitation, a vegetable oil-based additive for printing inks used for lithographic printing presses.

The instant invention also relates to printing inks, and more particularly to an additive having a biodegradable oil based vehicle/carrier for heatset, sheetfed and ultraviolet oil based ink systems to improve the ink's abrasion resistance, coefficient of friction and gloss.

The invention further relates to anti-abrasion additives for inks. Such additives are chemicals mixed or dispersed into ink formulations in order to impart strength and anti-rub properties to such inks after printing.

The invention also relates to novel additives for inks that provide improved mar, rub, or slip properties. The invention is also directed to novel inks such that when printed on paper, the printed paper is protected against abrasion while maintaining slip properties when the ink, and the paper or other material, is subjected to a variety of smearing, smudging, and marring forces. Such forces occur during use, shipping, or handling of the paper.

The invention additionally provides novel anti-abrasion additives which are particularly useful for heat-set, sheet-fed, and UV-coatable printing inks. This invention also relates to printing inks and more particularly to printing inks adapted for high speed printing operations.

BACKGROUND OF THE INVENTION AND DESCRIPTION OF THE PRIOR ART

Inks having low rub-off properties have been known in the prior art. Such inks typically contain waxes of various types and the resultant inks will exhibit improved mar-resistance, slip properties. Wax of a controlled fine particle size can be mixed or ground into the batch along with pigments or may be introduced during the final blending operations. Alternatively, the wax may be compounded into a "wax media" by dispersing or melting the wax into the varnishes and/or solvents and adding these to the ink.

It is also well-known that the non-rub qualities imparted by an individual wax are a function of both the particle size and the hardness as well as the melting temperature of the particular wax that is being used. However, addition of waxes to inks in order to solve the rub-off problem introduces other problems. First, on a scale of 100 representing no rub-off, waxes added to inks will result in reduction in rub-off to a level of only about 60. Second, with the heat and movement imparted by the friction of constant rubbing under pressure, particles of the ink film can ball up and mark unprinted areas. Additionally, the more waxes that are added to improve rub resistance, the more problems are introduced in respect to gloss and hardness characteristics. Addition of waxes to inks almost invariably decreases their gloss. Accordingly, a compromise must be achieved between the desired level of non-rub properties and gloss. Finally, there is the factor of increased cost associated with the ink containing relatively expensive waxes such as microcrystalline waxes and polytetrafluoroethylene powder. In the case of news inks, cost is an extremely important factor and, therefore, at the present time news inks do not ordinarily contain any waxes; furthermore, waxes provide only minimal reduction of rub-off in news ink formulations.

Synthetic waxes such as polyethylene waxes and polytetrafluoroethylene powders are now the most popular materials used in the ink industry. Such materials are usually added in the form of "non-rub" or "slip" media which are fine dispersions of the material in the solvents, oils and resins, etc., of the particular type of ink formulation in which it is to be incorporated. Additives prepared from polytetrafluoroethylene powders are suitable for all types of printing inks, but are especially ideal for heatset inks, where the temperature of the drying apparatus does not cause them to soften or melt. Polytetrafluoroethylene-based powders can also be stirred into finished inks to improve their rub and scuff resistance. Nevertheless, the relative cost of a polytetrafluoroethylene powder is prohibitively high for many-applications, e.g. news inks.

It is also known, that printing ink incorporates several different raw materials to formulate the finished ink. Such raw materials are dry pigment, pigment flushes, resins, oils, and specialty surface treated additives. Basically, these raw materials are petroleum based. Newspaper, magazine, fliers, board packaging and the like are all printed using large quantities, i.e., hundreds of thousands of pounds, of these ink ingredients yearly. The equipment used in the printing process is often computerized allowing for high speeds. It is essential that the raw materials meet and sometimes exceed quality control expectations. Melting points, particle size distribution, color, viscosities, tack, and flow properties all play a role in producing a finished ink.

Historically, the printing ink industry has utilized ink additives which are comprised of varying combinations of raw materials such as resins, ink solvents, polytetrafluoroethylene powders, microcrystalline, polyethylene and paraffinic waxes. Typical additives are classified as heat set additives, sheet-fed additives and UV ink additives. Due to the volatility of the resinous vehicles, safety precautions and proper explosion proof equipment is necessary to handle the possible hazards associated with these types of materials.

The heat set additives are typically comprised of a resin vehicle/carrier with a viscosity of 50,000-100,000 centipoise such as phenolic, hydrocarbon, anhydrous and other such family of resins, in addition to MagieSol 47 Oil (ink solvents), and a micronized polytetrafluorethylene for slip resistance. Typically the 47 or 470 solvents are used in heat set applications as well as ultra-violet inks. These types of solvents are necessary to achieve the desired wetting conditions required for creating the resin solution. The resins are used for rub and gloss resistance. The micronized polytetrafluoroethylene typically has a mean particle size of 3-5 microns. This is necessary for slip resistance (low coefficient of friction).

The solvent mixture is used as a vehicle/carrier for the polytetrafluoroethylene to protect the ink film. Typically, the range of the polytetrafluoroethylene loading level is 50-70% into the resin vehicle. The vehicle is formed when the resin reacts with the ink solvent. This is accomplished in a jacketed mixing vessel when the solid resin is heated to 10 degrees above the resins melt point, clarity is achieved and then slow cooled to ambient to make a resinous liquid. Viscosity ranges of the liquid at ambient typically are between 50,000-100,000 centipoise. Once this reaction is completed, 50-70% polytetrafluoroethylene is added to make a finished dispersion which is able to be added to the ink at about a 4% loading. This product would be added to the heat set ink and printed on a substrate. Direct heat cures the ink film. This causes the additive to rise to the surface of the ink causing a protective coating to form over the ink on the substrate. This restricts the amount of ink transference such as in the case of a newspaper where the ink rubs off onto the hand. Precautions should be taken when heating as the ink solvents volatilize into the atmosphere. In order to test the effectiveness of the rub resistance of the ink on the substrate, a Sutherland Rub Tester is used with a 4 lb. weight by 50 strokes. This measures the amount of ink being transferred from the substrate. This testing mimics the friction caused when finished products such as magazines, labeling on cans and packaging, etc. are transported to their end destination for the consumer.

The polytetrafluoroethylene resin solvent product used for sheet fed inks is not inter-changeable with heat set. Sheet fed inks are dried by oxidation as opposed to heat set which requires direct heat. The preferred performance additive here is typically polyethylene, microcrystalline or paraffinic type waxes into a solvent carrier. For added slip resistance, a low percentage of polytetrafluoroethylene (typically 5-10%) may be added to the composition.

The sheet fed inks have curing accelerators which react with the atmosphere causing a slow curing of the ink film. Historically, sheet fed ink is cured after 12-24 hours as opposed to the heat set inks which are cured immediately after exposure to direct heat. The additives in the sheet fed ink systems are comprised of a polyethylene or paraffinic waxes in a solvent carrier such as MagieSol 52 and must be produced using a heat exchanger. The procedure would be to add the polymer with the ink solvent in a jacketed enclosed explosion proof mixing vessel followed by heating to about 10 degrees above melting point of wax or polymer. Once clarity is achieved and polymer is completely melted, dry micronized polytetrafluoroethylene powder may be added if desired. Once totally dissolved, the temperature is reduced to between 120-140° Fahrenheit. The material is pumped from the vessel into a jacketed heat exchanger which causes the product to be quick cooled and produces the desired particle size needed. The discharge temperature of the solution should be 100 degrees F or below to achieve the desired viscosity. This is necessary to provide a particle size distribution between 3-5 microns and create enough surface area to meet with the expectations of the sheet fed ink and to create a broad surface area to maintain a high viscosity to encompass the wax additive so that it stays in suspension. This is known as a compound with a viscosity range of 100,000-500,000 centipoise. Once this additive is incorporated into sheet fed ink, the wax particles will work in conjunction with the accelerators in the sheet fed ink to bring them to the surface as a protective coating. As the sheet fed is cured, the solvent is released into the atmosphere. Once the ink is cured, the same procedures used in the previously described heat set evaluations are utilized with the Sutherland Rub Tester.

Ultraviolet inks also referred to as UV inks are cured using ultraviolet rays. Typically with UV film, microcrystalline and paraffinic waxes cannot be used due to the volatility of the reaction under ultraviolet which causes a cratoring or swelling of the ink film. Typically a polyethylene compound or a polytetrafluoroethylene dispersion or a polyethylene/polytetrafluoroethylene compound is used here instead. Once the ink film is cured under UV, the Sutherland Rub Testing is used for evaluation as is used in the previously described heat set and sheet fed ink systems.

As it will be appreciated, there are three distinctive products that must be utilized for each individual application. Also, powders such as polytetrafluoroethylene, polyethylene, and Fischer-Tropsch powders that must be micronized at a low micron mean particle size of 3-4 microns to maintain the ink specifications are used but not preferred due to handling problems such as dusting and as in the case of polytetrafluoroethylene, risk of Teflon fever which can occur when powder gets onto skin and into the saliva membranes. Many precautions must be taken when using these micronized powders in manufacturing such as installing pneumatic powdered transfer systems, clean rooms and ventilation systems along with OSHA regulated guidelines for personnel. Because of the many variables that arise with these ink film systems, typically high percentages of waxes and polytetrafluoroethylene powders are incorporated into these vehicles/carriers to protect the ink film.

Additionally, there have been problems with petroleum supplies worldwide. Some of the problems are high out-of-control pricing, land fill, environmental issues, supply and demand etc. In order to address these concerns, the ink manufacturers initiated efforts to develop inks with vehicles based on biodegradable derived materials to reduce the industry's dependency on petroleum. Thus there is a long felt need for biodegradable surface treated additives.

Some previous efforts to replace petroleum-derived components in printing inks include the following patents. U.S. Pat. No. 5,122,188 to Erhan, et al. discloses the use of "heat bodied" vegetable oils as a vehicle. The patent teaches that it is believed that "heat bodying" promotes polymerization of the oils utilizing double bonds thereby increasing the viscosity of the oil to desired range of between about 1.6-18 poises.

U.S. Pat. No. 5,552,467 to Reiter, et al. relates to a thermosetting lithographic ink compounded from solid resin, drying oil alkyds, bodied drying oil, vegetable oil, fatty acids, multifunctional unsaturated polyester, reducing agent and transition metal salts of organic acids, multifunctional unsaturated polyester, reducing agent and transition metal salts of organic acids. The patent teaches that the lithographic ink solution includes hydroperoxides of peroxides to promote free radical polymerization of the ink when activated by heating.

U.S. Pat. No. 6,762,216 to Fukuda, et al. teaches a printing ink composition that includes a vegetable oil, and a rosin-modified phenol resin having a weight average molecular weight of at least 30,000 dissolved in a vegetable oil. The ink composition further includes a volatile organic solvent up to about 3% by weight. The patent teaches that the vegetable oil is the main component for dissolving the resin in the ink, thereby reducing the volatile organic solvent below that used in conventional inks.

U.S. Pat. Application Publication No. 2005/0131103 to Hassan, et al. teaches waxes prepared from hydrogenated plant oils, which are formulated into aqueous ink and paper coating compositions. The waxes disclosed in this application are proposed as substitutes for petroleum based compositions and are useful in aqueous based ink formulations.

U.S. Pat. No. 5,591,796, issued to Wisniewski et al, discloses the use of polytetrafluroethylene in combination with poly-alphaolefins and suspended with resins in petroleum distillates as pumpable friction—reducing additives U.S. Pat. No. 5,749,949 to Tavares teaches the use of sintered polytetrafluoroethylene with resins suspended in petroleum distillates as friction reducers for inks.

U.S. Pat. No. 6,409,811 B1 to Tavares, et al, further describes the use of sintered polytetrafluoroethylene, but this time with petrolatum, microcrystalline waxes as friction reducers.

OBJECTS OF THE INVENTION

It is an object of the present invention to provide a biodegradable vehicle/carrier composition that can be incorporated into ink and coating formulations.

Another object of the present invention is to provide an ink or coating composition, which can be subsequently applied to articles such as paper, paperboard and the like for use in consumer and other packaged goods applications.

Still, another object of the present invention to provide a biodegradable vehicle/carrier composition that can be incorporated into ink and coating formulations as a substitute for petroleum-derived waxes currently used in such formulations.

A further object of the present invention is to provide a biodegradable vehicle/carrier composition that is readily dispersed in ink and coating formulations.

An additional object of the present invention is to provide a biodegradable vehicle/carrier composition which when formulated into an ink or coating, and which ink or coating is applied to an article as a barrier or for identification or information, the ink or coating has anti-mar, anti-abrasion and anti-rub performance characteristics similar to that of a conventional product presently used for this purpose.

Yet another object of the present invention is to provide a biodegradable vehicle/carrier composition that can be derived from a renewable resource in place of non-renewable petroleum based compositions.

A still further object of the present invention is to provide a biodegradable vehicle/carrier composition which can be derived from a renewable resource and which can be economically produced.

Another object of the present invention is to provide a biodegradable vehicle/carrier composition for use in ink and coating and for paper coating and have properties that are generally regarded as safe by the Food and Drug Administration.

A further object of the present invention is to provide an anti-rub, anti-abrasion and anti-mar ink and coating additive for non-aqueous inks and coatings, which is useful for increasing their performance properties. The additive of the present invention maintains good gloss and degradation properties in the ink or coating formulations in which it is used.

SUMMARY OF THE INVENTION

The invention provides a non-volatile fully biodegradable multifunctional vehicle/carrier used for printing inks to impart rub, mar and slip resistance (Low Coefficient of friction) as a protective coating of the ink film. The basic principal is to incorporate the additive with the ink and apply an even distribution of the ink mixture to the surface of a substrate such as high end coated cover stock, non-coated cover stock, insert stock, uncoated stock, paper and board stocks. This is necessary to limit the amount of transference of the ink off of the stock which in turn destroys the printed surface. These stocks are typically used for high and medium gloss magazines, insert fliers, labels, etc. All printing ink additives for oil base inks are separated into three categories: heat set, sheet fed and ultra-violet ink systems.

The present invention also pertains to a composition useful as an additive to a printing ink. In one or more embodiments, the composition reduces rub-off and transfer tendency of the ink after it is applied to the surface of a suitable material. In additional embodiments, the composition includes triglycerides formed from one or more saturated and unsaturated straight, branched or cyclic fatty acids selected from the group having $C_8$ to $C_{24}$, including but not limited to lauric/myristic-stearic/oleic-lauric/myristic either individually or in combinations thereof, wherein the triglycerides are partially to Fully hydrogenated and have a viscosity between about 50 and about 150,000 centipoise at a temperature of about 72° F. In certain embodiments, the composition further includes an additional component, for example, a finely divided polytetrafluoroethylene, a finely divided natural or synthetic wax, a finely divided hydrogenated triglycerides and preservatives.

In another aspect, the invention relates to a method for forming an ink additive composition, wherein the composition has a pre-selected particle size and viscosity. The method includes providing a mixing apparatus and a heat exchanger apparatus wherein the mixing apparatus has heating and cooling capabilities and is also capable of generating a vortex in the base material. The heat exchanger component of the apparatus has controlled cooling capabilities to maintain an outlet temperature between about 60° and 100° F. The method includes the steps of placing a pre-selected amount of base material formed from one or more triglycerides in various combinations (the triglycerides being at least partially hydrogenated thereby having a viscosity between about 50 and about 150,000 centipoise at temperature about 72° F.) in the mixing apparatus; operating the mixing apparatus so that the shear/agitation creates a vortex in the base material; adding, into the vortex, a pre-selected amount of an additive such as a finely divided natural or synthetic wax, finely divided polytetrafluoroethylene, and finely divided hydrogenated triglycerides in the mixing apparatus. Thereafter, the base material and the additive are mixed under shear while heating to a temperature about 200° F. or above the highest temperature of the base material; the heated mixture is cooled to a temperature between 140° and about 120° F.; and the resulting mixture is discharged into the heat exchanger and it is cooled to between about 60° and about 100° F., thereby forming the composition having the desired particle size and viscosity.

The instant invention also provides a composition useful as an additive to a non-aqueous ink comprising: (a) a base material formed from one or more saturated or unsaturated straight or branched triglyceride esters derived from fatty acids selected from the groups of $C_8$ to $C_{24}$ fatty acids or mixtures thereof, said triglycerides optionally being partially to fully hydrogenated; and (b) optionally a material selected from a group consisting of fluorinated polymers, natural and synthetic waxes and hydrogenated triglycerides derived from $C_8$ to $C_{20}$ unsaturated fatty acids.

The invention also relates to a method for making a composition useful as an ink additive comprising the steps of: (a) heating and mixing under shear so as to generate a vortex, component (a) as defined above; (b) adding, into the vortex, a pre-selected amount of a finely divided component (b) as defined above, while heating to a temperature of about 150°-70° F.; (c) cooling said heated mixture to a temperature between about 120° and about 140° F.; (d) monitoring the particle size distribution and the viscosity of the resulting mixture; and (e) when the desired particle size distribution viscosity is achieved, discharging said mixture while cooling to a discharge temperature between about 60° and about 100° F.

The present invention also describes a non-aqueous printing ink having rub-off and transfer resistance comprising: (a) effective amounts of customary non-aqueous ink components; and (b) effective amounts of a biodegradable additive comprising: (i) a base material formed from one or more saturated or unsaturated straight or branched triglyceride esters derived from fatty acids selected from the groups of $C_8$ to $C_{24}$ fatty acids or mixtures thereof, said triglycerides optionally being partially to fully hydrogenated; and (ii) optionally a material selected from a group consisting of fluorinated polymers, natural and synthetic waxes and hydrogenated triglycerides derived from $C_8$ to $C_{24}$ unsaturated fatty acids.

The invention further provides a method of printing paper stock by letter press or lithography using paste inks having rub-off and transfer resistance which method comprises: (a) providing a letter press or lithographic press; (b) applying an effective amount of the additive of claim 1 to an ink composition; (c) running a sufficient quantity of paper stock thru the press thereby applying a sufficient quantity of the ink to the paper stock to imprint the stock; and (d) heating the paper stock having the imprint thereon for a sufficient time to cure the imprint.

The invention is also directed to a composition useful as an additive to a paste printing ink for reducing rub-off and transfer tendency of the ink comprising: (a) about 63-65% by weight of a base material formed from one or more saturated or unsaturated straight or branched triglyceride esters derived from fatty acids selected from the groups of $C_8$ to $C_{24}$ fatty acids or mixtures thereof, said triglycerides optionally being partially to fully hydrogenated; and (b) about 35-37% by weight of a finely divided polytetrafluoroethylene having a particle size of less than about 5 micron, said composition having a Brookfield (Lvt/TF/6 rpm/@25° Celsius) viscosity of about 150,000 centipoise.

The printing ink additive according to the present invention is a stable formulation with a consistent viscosity at ambient temperatures. The current ink additives in the market place require the use of heated tank and heat traced lines to transfer the ink having the additive therein to the press. The ink additives of the present inventing generally do not require heat traced lines, because the method of the instant invention adjusts the viscosity and particle size by heating the mixture to a temperature about 10° above the highest melting component of the base material followed by controlled cooling under low to medium shear mixing conditions which provides a controlled particle size and viscosity and the viscosity is substantially stable at ambient conditions.

The controlled particle size and viscosity of the composition according to the invention thereby advances the art of non-aqueous heatset, sheeted, and ultraviolet printing ink systems by substantially improving the efficiency by reducing the need for heat-traced feed lines to the presses.

DETAILED DESCRIPTION OF THE INVENTION

The bio-based product of the invention is a multifunctional additive and can be incorporated into heat set, sheet fed and UV inks without the use of volatile solvents and uses lower percentages of polytetrafluoroethylene and other waxes while still maintaining a high degree of performance. Unlike the typical resinous vehicles used to transfer the wax or polytetrafluoroethylene product to the surface, the bio-based additives of the invention are comprised of 100% active ingredients. As mentioned previously 50-70% of polytetrafluoroethylene and other paraffinic types of waxes are added to these other vehicles. The bio-based formula of the invention is comprised of vegetable or plant based oils and low percentages of polytetrafluoroethylene, typically 5-35% by weight.

For a number of years, decreasing the percentages of polytetrafluoroethylene in these vehicles/carriers in high end cover stock areas has always been a target goal with respect to reducing cost, handling and environmental hazards. The issues with lowering these additives has always been poor performance, product viscosity loss, separation of the vehicle from the wax or polytetrafluoroethylene additive, handling of the product, heat stability and shelf life. When considering these and other factors, the goal of the present invention was to create a product that meets and exceeds these and other variables.

When lowering the content polytetrafluoroethylene, it is necessary to incorporate other additives that would complement each other. As the polytetrafluoroethylene is lowered, product performance and viscosities are affected. By the addition of complex amides and complex clays we have determined that these additives enhance the wetting characteristics and provide stability in the overall viscosity to maintain shelf life. This additive package offers dual benefits. This biodegradable product offers universal usage for the heat set, sheet fed and ultraviolet ink systems and outperforms the standard 50% or greater synthetic based product.

While this invention is satisfied by embodiments in many different forms, there is herein described in detail, embodiments of the invention with the understanding that the present disclosure to be considered as exemplary of the principles of the present invention and is not intended to limit the scope of the invention to the embodiments illustrated. The scope of the invention is measured by the appended claims.

The present invention relates to: (1) a biodegradable vehicle carrier additive; (2) methods of making such additive; and (3) printing inks containing such additives.

In the first embodiment of the invention, the printing ink additive is a composition comprising: (a) a base material formed from one or more saturated or unsaturated triglycerides of $C_8$ to $C_{24}$ fatty acids and mixtures thereof, wherein said triglycerides are partially to fully hydrogenated and (b) optionally a material selected from finely divided synthetic and natural waxes, finely divided polytetrafluoroethylene (PTFE), and finely divided hydrogenated triglycerides.

The particular mixture and source of one or more triglycerides is not critical to the function of the print additive of the invention, and many different combinations of shorter and longer chain linear or branched triglycerides with different degrees of unsaturation are able to produce the properties useful as a base material. For particular applications, i.e., if it is desired that only vegetable oils be used, then particular sources may be preferred. For other particular applications it may be may be desirable to use mixtures of oils from other animal or petroleum sources, in these cases, when oils from other sources are used, care should be taken to ensure that the additive of the invention is compatible with the printing ink intended to be used.

The additive of the invention when properly manufactured should have a viscosity between about 50 and about 200,000 centipoise at a temperature of about 72° F. more preferably from about 50,000 to about 80,000 centipoise and most preferably from about 100,000 to about 200,000 centipoise.

The preferred base material is formed from a partially/fully hydrogenated oil mixture having between about 5 and about 15 percent by weight of palmitic acid; between about 10 and about 90 percent by weight of stearic acid; between about 3 and about 40 percent by weight of oleic acid; between about 5 and about 10 percent by weight of linoleic acid; and between about 0 and about 3 percent by weight linolenic acid. Suitable based materials which are commercially available include partially hydrogenated soybean and cottonseed oil mixtures which are available from Columbus Foods, Chicago, IL, listed under stock numbers 180, 182, 222 and as a beef fat/vegetable oil mixture as 835. A particularly preferred partially hydrogenated soybean and cottonseed oil blend is Columbus 180. Alternatively, additional suitable blended oils for use as base materials are available from Golden Brands, Louisville, Ky., MidAtlantic Vegetable Shortening, Kearny, N.J., and Cargill Vegetable Oils of Minneapolis, Minn.

More specifically, the base material is a mixture of about 30-95% by weight partially hydrogenated vegetable oil and about 5 to about 70% by weight fully hydrogenated vegetable oil; more preferably it is a mixture of about 70-90% by weight partially hydrogenated vegetable oil and about 10 to about 30% by weight fully hydrogenated vegetable oil and most preferably is a mixture of about 80-90% by weight partially hydrogenated vegetable oil and about 10 to about 20% by weight fully hydrogenated vegetable oil. A particularly preferred base material is a mixture of about 88% by weight partially hydrogenated vegetable oil and about 12% by weight fully hydrogenated vegetable oil.

Other vegetable or naturally derived oils that can be used in the practice of the invention include linseed, safflower, sunflower, corn, sesame, canola (rapeseed), olive, palm, coconut and peanut.

The preferred ink additive of the invention can be used by itself or in combination with component (b). When used with component (b), component (a) is present in an amount of about 20% by weight to about 99.5% by weight; more preferably about 40% by weight to about 80% by weight of the composition and most preferably about 60% by weight to about 70% by weight of the composition.

Component (b) which is finely divided typically is present between about 0.5% to about 80% by weight of the composition, more preferably about 20% by weight to about 60% by weight of the composition and most preferably about 30% by weight to about 40% by weight of the composition.

Component (b) typically has a particle a size of less than about 15 microns, more preferably less than 10 microns and most preferably less than 5 microns.

As stated above, component (b) is material selected from finely divided synthetic and natural waxes, finely divided polytetrafluoroethylene (PTFE), and finely divided hydrogenated triglycerides. The wax can be a petroleum paraffin wax, a microcrystalline wax or a material such as polyethylene wax or oxidized polyethylene wax, and mixtures thereof. Other useful waxes which can be used in the present invention generally have melting points within the range of about 20° C. to about 200° C., and they include animal waxes, mineral waxes, vegetable waxes, insect waxes, and other synthetic waxes including: beeswax; bayberry-myrtle; candelilla; caranday; carnauba; castor bean wax; esparto grass wax; Japan wax; montan crude wax; shellac wax; spermaceti; sugar cane wax; and wool wax-lanolin.

According to another embodiment of the invention, component (b) is a finely divided material which comprises between about 1 to about 70 percent by weight of the composition, more particularly, the material may be 20 to about 50 percent by weight. In a specific embodiment, the finely divided material is polytetrafluoroethylene (PTFE) having a particle size less than about 10 microns and is present in the composition of the invention at 35 percent by weight. A suitable PTFE material is available from Solvay Solexis, Therefore, N.J. under the trade name "Angolan". These PTFE powders are available in a range of particle sizes. Another suitable PTFE material is available from 3M, Minneapolis, Minn. under the trade name "DYNEON". This PTFE material is supplied with a particle size of about 3 to 4 microns. When these PTFE materials are subjected to the heating, mixing and cooling conditions of the method of the present invention, the resultant composition has a particle size of about 5 microns or less as measured using the NPIRI method and the Decimeter test apparatus as described further below. A suitable PTFE material has a color density range between about 0.00 to about 0.20 as measured on a Macbeth densitometer or a 500 Series Spectrodensitometer from X-Rite of Grand Rapids, Mich.

The typical densitometry readings are 0.00-0.08=white; 0.09-0.12=off-white; and 0.13-0.20=light gray. In several embodiments of the invention, the composition has a low densitometry reading. By having a low densitometry reading, the composition will have-little effect on the brightness and brilliance of the colors of the inks where it is incorporated to reduce rub-off and transfer.

The printing ink additive of the invention when added to an ink imparts significant reduction in rub-off and transfer resistance to the printed product. The additive of the invention is typically present in the ink composition in an amount from about 4 to about 10 percent by weight depending on the type of ink being made i.e., heatset, sheetfed or UV ink.

A suitable test for rub-off and transfer is the Sutherland rub-off test as described in ASTM D 5264 which is incorporated by reference in its entirety. This test utilizes a standardized rubbing apparatus with a standard weight and rubbing surface, which is operated against the material being tested. The composition according to an embodiment of the invention incorporated into a compatible paste ink provides a statistically significant reduction in rub-off and transfer when compared to the same ink without the addition of the composition of the invention.

In order to perform a Sutherland test, samples of paper stock imprinted with an ink having the composition according to embodiments of the present invention at a usage level of between about 4 and 10 percent by weight are prepared. An exemplary method for printing paper stock by letter press or lithography using paste inks having rub-off and transfer resistance includes providing a suitable letter press or lithographic press. The exemplary method then includes applying a sufficient quantity of a paste ink having between about 4 and 10 percent by weight of the composition of the invention to the press and running a sufficient quantity of a suitable paper stock thru the press thereby applying a sufficient quantity of the ink to the paper stock to imprint the stock. In the case of an ink composition according to an embodiment of the invention, the method then includes sufficiently heating the paper stock having the imprint thereon to cure the imprint. These samples are then utilized in the Sutherland rub-off and other physical and appearance tests Generally, the additive composition according to embodiments of the invention is mixed with a compatible non-aqueous heat setting paste ink formulation in an amount between about 4 and about 10 percent by weight. This paste ink formulation includes a compatible vehicle, a sufficient quantity of a compatible colorant, and may also include other additives for controlling foaming, misting, spread ability and the like that are known to one skilled in the art of printing inks.

In another preferred embodiment, the particle size of component (b) is reduced to less than five micron during mixing with the base material. The particle size is determined during mixing by sampling and measurement. A suitable method for measuring the particle size of the components of the mixture utilizes a 2070 National Printing Ink Research Institute (NPIRI) fineness of grind gauge available from Decimeter Instruments, Rochester Hills, Mich. A sufficient quantity of the material being tested is applied into the deeper end of the decreasing depth groove on the block and drawn down towards the shallow end of the groove with a standard scraper. The further the material is moved up the calibrated groove before being separated out is an indication of the particle size.

The further up the groove the material is uniformly moved by the standard scraper is indicative of a smaller particle size.

The method for the preparation of the composition of the invention includes providing a suitable mixing apparatus having heating and cooling capabilities capable of generating a vortex in the base material, and a heat exchanger apparatus having controlled cooling capabilities to maintain a discharge temperature between about 60° and about 100° F. The method includes placing a pre-selected amount of base material comprising one or more triglycerides from select categories individually or in compatible combinations thereof as described above, wherein the triglycerides are at least partially hydrogenated and having a viscosity between about 50 and about 150,000 centipoise at temperature about 72° F. in the mixer. The mixer is initially operated at a rate sufficient (always maintaining a vortex) temperature sufficient to melt the partially/fully hydrogenated vegetable oil base (preferably between about 100° to about 200° F.) for about 15-30 minutes. Once the base material has melted, the mixer speed is increased to a medium shear speed sufficient to create a vortex, in the base material. A suitable high shear mixer with a side sweep is an Unmeant 125 (3 hp with E192a motor, as supplied by Lee Equipment). Once this vortex is achieved, a pre-selected amount of the finely divided material is then gradually added into the vortex and, once all the material is added, the mixture is further mixed for about an additional 15 minutes (preferably at a temperature between about 100° to about 200° F. at the medium shear conditions.

A particularly preferred amount of the polytetrafluoroethylene (PTFE) is about 35 percent by weight of the composition, with the balance being base material for various applications. The concentration of finely divided material may be varied between about 0.5 to about 80 percent by weight of the composition.

In some other applications, the ranges for the concentration of the finely divided material may be between about 1 to about 70 percent by weight of the composition and more preferably between about 20 to about 50 percent of the composition.

According to an additional embodiment of the invention, the composition is sufficiently mixed and the heated mixture is cooled to a temperature between about 120° and about 140° F., preferably about 120° F., and mixed for a sufficient additional period, preferably about an additional 5-10 minutes. During this final mixing, the particle size distribution can be monitored, and once the desired particle size distribution is achieved, discharged into a heat exchanger and further cooled to a discharge temperature between about 60° and about 100° F.

The mixer that is used to make the compositions of the invention has a high shear agitator and a sweep arm. It is further preferred that the heat exchanger apparatus is selected from the group consisting of a scraped surface heat exchanger, a colloid mill and a homogenizer having controlled cooling capability. This provides a composition having a viscosity of between about 90,000 to about 300,000 centipoise, most preferably about 150,000 centipoise.

The resulting composition according to the invention is a substantially translucent material with a Brookfield viscosity (Lvt/TF/6 rpm @25 degrees Celsius) of about 150,000 centipoise. The composition of the invention also imparts an improved glossiness to the imprint. This improved gloss is preferably measured using a Gardener Gloss meter following the test protocol ASTM D 523.

The novel composition according to the present invention provides users of non-aqueous heat setting paste printing ink, which may have either petroleum or biologically based vehicles, with a stable and effective additive to enhance the resistance of the ink to rub off and transfer. As described above, the composition of the invention utilizes biologically based, i.e., either vegetable or animal, triglycerides as a primary constituent, thus reducing the printing industry's dependence on petroleum based raw materials and which provide performance comparable to that of currently available additives.

EXAMPLES 1 THROUGH 5

Evaluation of Various Blends of the Triglycerides of This Invention With PTFE as to Their Uniformity, Storage Stability and Compatibility With an Ink Composition The following mixtures as shown in Table 1 were made by first heating the shortening and soy to 80° C., then blending in the PTFE and mixing for an hour, and, finally, finishing by cooling the mixture to 40° C., and discharging without mixing. The mixtures were then allowed to cool, to ambient conditions without further mixing.

The shortening was a soy and cottonseed blend of a Mettler Dropping Point between 100° F. and 130° F. The low-melt hydrogenated soy had a melting point between 100° F. and 120° F. and the high-melt hydrogenated soy had a melting point between 130° F. and 180° F. All were available from companies such as Columbus, Golden Brands, Mid-Atlantic and Cargill.

Following the preparations, timed observations were made at 40° C as to the tendency of the mix to undergo syneresis. Their compatibility with ink formulations was determined by the effect on the sizes of particles of an ink composition when 4% of these compositions were added. If the compositions are of good quality, there will be no syneresis, no separation of PTFE and the particles in the ink will be less than 5 microns.

TABLE 1

| Component | Example 1 | Example 2 | Example 3 | Example 4 | Example 5 |
|---|---|---|---|---|---|
| Shortening | 61.75% | 61.75% | 63.5% | 48.73% | 65.00% |
| Low melt hydrogenated Soy (Mettler Dropping Point 100 F-120 F) | 3.25% | 1.63% | 1.5% | X | X |
| High melt hydrogenated soy (Mettler Dropping Point 130 F-180 F) | X | X | X | 16.27% | X |
| PTFE | 35.00% | 35.00% | 35.00%. | 35.00% | 35.00% |
| Particle size (by NPIRI gauge) | 3-4 microns | 3-4 microns | 3-4 microns | 3-4 microns | 3-4 microns |
| Syneresis | None | None | None | None | None |
| Marbling (indicating PTFE separation) | None | None | None | None | None |

All of these compositions shown in of Table 1, have excellent uniformities and storage stabilities.

EXAMPLES 6 THROUGH 11

Evaluation of the Triglyceride Blends of Examples 1-5 as Friction-Reducing Preparations Under the Conditions of the Rub Test Described Above In this Examples, as a control a print of the ink only was prepared as well.

The resulting printed panels were tested for loss of color density as a result of being abraded in the rub test procedure. All showed virtually no loss in color density except the ink-only sample which lost nearly a third of its color. The results are summarized in Table 2.

TABLE 2

| Component | Example 6 | Example 7 | Example 8 | Example 9 | Example 10 | Example 11 (Ink only) |
|---|---|---|---|---|---|---|
| Shortening | 61.75% | 61.75% | 63.5% | 48.73% | 65.00% | X |
| Low melt hydrogenated Soy | 3.25% | 1.63% | 1.5% | X | X | X |
| High melt hydrogenated soy | X | X | X | 16.27% | X | X |
| PTFE | 35.00% | 35.00% | 35.00%. | 35.00% | 35.00% | X |
| Color density prior to rub test | 1.00 | 1.07 | 1.02 | 0.93 | 1.03 | 1.09 |
| Color density in area affected by rub test | 0.99 | 1.06 | 1.02 | 0.93 | 1.02 | 0.70 |
| Loss in color density | −1.0% | −0.93% | −0.00% | −0.00% | −0.97% | −27.6% |

All of the compositions of Table 2 show excellent rub resistance.

EXAMPLES 12-17

Loss in Pigment Densities Due to Abrasion are Compared for Biobased, Microcrystalline-Wax, Polyethylene, and Resin/Petroleum Dispersions of PTFE, and Further Compared to the Density Loss Using a Triglyceride Mix Vehicle Without any Friction Reducer and an Ink Only

| Original color density of print | EXAMPLE 12 % color density loss using PTFE/ biobased compound dispersions | EXAMPLE 13 % color density loss using micro-crystalline wax dispersions | EXAMPLE 14 % color density loss using polyethylene dispersions | EXAMPLE 15 % color density loss using PTFE/ resin/ petroleum dispersions | EXAMPLE 16 % color density loss using triglyceride mix only with no PTFE | EXAMPLE 17 % color density loss of ink only |
|---|---|---|---|---|---|---|
| 2.37 | | | | | −64.40% | |
| 2.35 | | | | | −64.25% | |
| 2.32 | | | | | −68.24% | |
| 2.29 | | | | | | −62.45% |
| 2.27 | −3.96% | | | | −72.81% | |
| 2.25 | | | −57.33% | | | |
| 2.23 | | | | −47.5% | | |
| 2.22 | | | | | | −58.60% |
| 2.21 | | | −50.23% | | | |
| 2.19 | | | | | −60.12% | |
| 2.16 | | −46.8% | | | | |

-continued

| Original color density of print | EXAMPLE 12 % color density loss using PTFE/biobased compound dispersions | EXAMPLE 13 % color density loss using micro-crystalline wax dispersions | EXAMPLE 14 % color density loss using polyethylene dispersions | EXAMPLE 15 % color density loss using PTFE/resin/petroleum dispersions | EXAMPLE 16 % color density loss using triglyceride mix only with no PTFE | EXAMPLE 17 % color density loss of ink only |
|---|---|---|---|---|---|---|
| 2.13 | | | | −42.72 | | |
| 2.14 | | −49.1 | | | | |
| 2.11 | | −48.8 | −53.08% | | | |
| 2.06 | | | | | | −45.80% |
| 2.05 | | | −54.15% | | | |
| 2.02 | 0.00 | | | | | |
| 1.95 | | −51.28 | | | | |
| 1.93 | | | | | | −52.46% |
| 1.75 | | | | | | −57.12% |
| 1.88 | | | | −2.66 | | |
| 1.80 | | | −32.7% | | | |
| 1.72 | 0.00 | | | | | |
| 1.60 | | −39.4 | | | | |
| 1.54 | | | | | −48.1 | |
| 1.49 | | | −22.8% | | | |
| 1.39 | | | | −7.19 | | |
| 1.36 | 0.00 | | | | | |
| 1.24 | | −.25 | | | | |
| 1.23 | | | | | −45.55% | |
| 1.17 | | | −18.8% | | | |
| 1.09 | | | | | | −27.2% |
| 1.04 | 0.00 | | | | | |
| 1.01 | | | | −2.97 | | |
| 1.00 | | | | | −38.8% | |
| 0.89 | | | −15.24% | | | |
| 0.86 | | | | | | −20.1% |
| 0.74 | | | | | −21.1% | |

These samples were printed using a blue heat-set ink with the PTFE dispersions blended in. The prints were done using an Offset Proofing Press from Little Joe Industries of Hillsborough, N.J. The pigment densities were determined using a 500 Series Spectro-densitometer fi-om X-Rite Industries in Granville, MI. The glosses were determined using a Microgloss 60 deg glossmeter from TriColor Sytems, Inc. of Elgin, Ill. (provided by BYK/Gardner). The rub tests were carried out using a Southerland 2000 rub tester from the Danilee Co. of San Antonio Tex.

The prints were prepared—ten prints from one inking—and each print was dried for 15 seconds (for the first three prints) or 10 seconds (for the last seven prints). The densities were then determined as well as the glosses on each freshly printed sample. Rub tests were performed—50 strokes, 2 seconds per stroke using a four pound weight—on the Southerland tester. Then the densities were re-determined on the rubbed areas.

Comparing Example 12, the subject of this invention, to Examples 13 and 14, we see the advantage of PTFE over other friction reducers. Comparing Example 12 to Example 15, we see the advantage of the triglyceride vehicle over the traditional resin/petroleum distillate vehicle. Comparing Example 12 to examples 16 and 17, we see the crucial nature of both the PTFE and an appropriate vehicle.

The following Examples are representative examples of inks containing the additives of the invention.

EXAMPLE 18

The following is a Letter press ink formulation

| Component | % by weight |
|---|---|
| Carbon black (CI P. Black 7) | 19.0 |
| Reflex blue (CI P. Blue 18) | 2.0 |
| 70 Pa s mineral oil | 51.0 |
| 0.05 Pa s mineral oil | 9.0 |
| 1.05 Pa s bodied linseed oil | 10.0 |
| Asphaltum solution | 5.0 |
| Composition of Example 1 | 4.0 |
| | 100.0 |

EXAMPLE 19

The following is a web-offset heat-set ink.

| Components | % by weight |
|---|---|
| CI P. Yellow 12 | 12.0 |
| Varnish | 69.5 |
| High mol. wt. phenolic resin | 33.1 |
| High viscosity linseed alkyd | 8.8 |
| Aromatic free distillate 240/270 | 14.1 |
| Aromatic free distillate 260/290 | 17.6 |
| Aluminum chelate | 0.4 |
| Low viscosity linseed alkyd | 5.0 |
| Aromatic free distillate 240/270 | 7.0 |
| Polyethylene wax | 2.0 |

-continued

| Components | % by weight |
|---|---|
| Composition of Example 2 | 0.5 |
| | 100.0 |

EXAMPLE 20

The following is a sheet-fed lithographic ink; especially suited for packaging carton

| Component | % by weight |
|---|---|
| CI P. Red 57:1 | 20.0 |
| Low odour varnish | 64.5 |
| Rosin-modified phenolic resin | 13.5 |
| Rosin-modified maleic resin | 13.5 |
| Low viscosity soya alkyd | 16.9 |
| Aromatic free distillate 280/310 | 22.9 |
| Aluminum-based gelling agent | 0.7 |
| Polyethylene wax | 3.0 |
| Composition of Example 3 | 1.0 |
| Cobalt driers | 1.0 |
| Manganese driers | 2.0 |
| Anti-oxidant | 0.5 |
| Aromatic free distillate | 5.0 |
| | 100.0 |

EXAMPLE 21

The following is an Example of a UV ink.

| Component | % by weight |
|---|---|
| CI P. Blue 15:3 | 16.0 |
| Carbon black (CI P. Black 7) | 4.0 |
| Epoxy acrylate resin | 29.0 |
| Fatty acid modified epoxy acrylate | 23.0 |
| Monomer viscosity modifier | 7.0 |
| Benzophenone initiator | 8.0 |
| Coinitiator | 3.0 |
| Aromatic amine photosynergist | 4.0 |
| Stabilizer, waxes, etc. | 2.0 |
| Composition of Example 4 | 4.0 |
| | 100.0 |

All patents, patent applications and publications cited in this application including all cited references in those applications, are hereby incorporated by reference in their entirety for all purposes to the same extent as if each individual patent, patent application or publication were so individually denoted.

While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting. It is to be understood that the terms used herein are merely descriptive rather than limiting and that various changes, numerous equivalents may be made without departing from the spirit or scope of the claimed invention.

What is claimed is:

1. A composition useful as an additive for non-aqueous inks that provides rub-off and transfer resistance to printed paper stock consisting essentially of:
   (a) about 20% by weight to about 99.5% of a base material having a viscosity of at least about 50,000 centipoise at about 72° Fahrenheit formed from one or more saturated or unsaturated straight or branched triglyceride esters derived from fatty acids selected from the groups of $C_8$ to $C_{24}$ fatty acids or mixtures thereof, said triglycerides being partially to fully hydrogenated; and
   (b) about 0.5 to about 80 percent by weight of a finely divided material selected from a group consisting of fluorinated polymers, natural and synthetic waxes and hydrogenated triglycerides derived from $C_8$ to $C_{24}$ unsaturated fatty acids wherein said material has particles having a size of less than about 10 microns and wherein said composition provides an ink having minimal loss in color density when compared with an ink that doesn't have the additive.

2. The composition of claim 1, wherein said component (a) is a mixture of naturally derived vegetable oils and partially to fully hydrogenated vegetable oils.

3. The composition of claim 1, wherein said component (b) is polytetrafluoroethylene.

4. The composition of claim 1, wherein said component (a) is a triglyceride containing lauric/myristic-stearic/oleic fatty acids or oleic/linoleic-lauric/myristic fatty acids.

5. The composition of claim 1, wherein said base material is a mixture of about 30-95% by weight partially hydrogenated vegetable oil and about 5 to about 70% by weight fully hydrogenated vegetable oil.

6. The composition of claim 5, wherein said base material is a mixture of about 70-90% by weight partially hydrogenated vegetable oil and about 10 to about 30% by weight fully hydrogenated vegetable oil.

7. The composition of claim 6, wherein said base material is a mixture of about 80-90% by weight partially hydrogenated vegetable oil and about 10 to about 20% by weight fully hydrogenated vegetable oil.

8. The composition of claim 7, wherein said base material is a mixture of about 88% by weight partially hydrogenated vegetable oil and about 12% by weight fully hydrogenated vegetable oil.

9. The composition of claim 1 wherein said finely divided component (b) comprises between about 20 to about 60 percent by weight of the composition.

10. The composition of claim 9 wherein said finely divided component (b) comprises between about 30 to about 40 percent by weight of the composition.

11. The composition of claim 1 wherein said component (b) has particles having a size of less than about 5 microns.

12. The composition of claim 11, wherein said particles are polytetrafluoro-ethylene in an amount of about 35% by weight of the composition.

13. The composition of claim 12, wherein the viscosity of said composition as measured by Brookfield Viscometer (Lvt/TF/6 rpm@25° Celsius) is about 150,000 centipoise.

14. A method, for making a composition useful as an ink additive comprising the steps of:
   (a) heating and mixing under shear so as to generate a vortex, component (a) as defined of claim 1;
   (b) adding, into the vortex, a pre-selected amount of a finely divided component (b) as defined in claim 1; while heating to a temperature of about 150°-170° F.;
   (c) cooling said heated mixture to a temperature between about 120° and about 140° F.;

(d) monitoring the particle size distribution and the viscosity of the resulting mixture; and
(e) when the desired particle size distribution viscosity is achieved, discharging said mixture while cooling to a discharge temperature between about 60° and about 100° F.

15. The method of claim 14, wherein step (a) uses a mixing apparatus with a high shear agitator and a side-sweep arm.

16. The method of claim 14, wherein said apparatus includes a heat exchanger.

17. The method of claim 14, wherein component (b) achieves a particle size less than 5 micron after being subjected to the conditions in the mixer.

18. The method of claim 17, wherein component (b) is polytetrafluoroethylene.

19. A method of printing paper stock by letter press or lithography using paste inks having rub-off and transfer resistance which method comprises:
(a) providing a letter press or lithographic press;
(b) applying an effective amount of the additive of claim 1 to an ink composition;
(c) running a sufficient quantity of paper stock thru the press thereby applying a sufficient quantity of the ink to the paper stock to imprint the stock; and
(d) heat the paper stock having the imprint thereon for a sufficient time to cure the imprint.

20. A composition useful as an additive to a paste printing ink for reducing rub-off and transfer tendency of the ink in printed paper stock consisting essentially of:
(a) about 63-65% by weight of a base material formed from one or more saturated or unsaturated straight or branched triglyceride esters derived from fatty acids selected from the groups of $C_8$ to $C_{24}$ fatty acids or mixtures thereof, said triglycerides being partially to fully hydrogenated;
(b) about 35-37% by weight of a finely divided polytetrafluoroethylene having a particle size of less than about 5 micron, said composition having a Brookfield. (LVt/TF/6 rpm/@25° Celsius) viscosity of about 150,000 centipoise and wherein said composition provides an ink having minimal loss in color density when compared with an ink that doesn't have the additive.

* * * * *